US012592390B2

(12) United States Patent
Guan et al.

(10) Patent No.: US 12,592,390 B2
(45) Date of Patent: Mar. 31, 2026

(54) NEGATIVE ELECTRODE PLATE, ELECTROCHEMICAL DEVICE CONTAINING SAME, AND ELECTRONIC DEVICE

(71) Applicant: Ningde Amperex Technology Limited, Ningde City (CN)

(72) Inventors: Wenhao Guan, Ningde (CN); Maohua Chen, Ningde (CN); Yuansen Xie, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 554 days.

(21) Appl. No.: 17/709,572

(22) Filed: Mar. 31, 2022

(65) Prior Publication Data

US 2022/0328842 A1 Oct. 13, 2022

Related U.S. Application Data

(63) Continuation of application No. PCT/CN2021/084579, filed on Mar. 31, 2021.

(51) Int. Cl.
*H01M 4/62* (2006.01)
*H01M 4/02* (2006.01)
(Continued)

(52) U.S. Cl.
CPC ............ *H01M 4/628* (2013.01); *H01M 4/134* (2013.01); *H01M 4/382* (2013.01);
(Continued)

(58) Field of Classification Search
CPC ...... H01M 4/628; H01M 4/134; H01M 4/382; H01M 10/052; H01M 2004/021;
(Continued)

(56) References Cited

U.S. PATENT DOCUMENTS

| | | | |
|---|---|---|---|
| 5,378,551 A | 1/1995 | Meadows et al. | |
| 2019/0131617 A1* | 5/2019 | Ahn | H01M 4/0404 |
| 2019/0165429 A1 | 5/2019 | Lu | |

FOREIGN PATENT DOCUMENTS

| | | |
|---|---|---|
| CN | 103000954 A | 3/2013 |
| CN | 105489853 A | 4/2016 |

(Continued)

OTHER PUBLICATIONS

Wei et al., An overview of lead-free piezoelectric materials and devices, 2018, J. Mater. Chem. C, 6, 12446-12467 (Year: 2018).*

(Continued)

*Primary Examiner* — Daniel S Gatewood
(74) *Attorney, Agent, or Firm* — XSENSUS LLP

(57) ABSTRACT

A negative electrode plate includes a negative current collector, a lithium metal negative electrode, and a negative electrode framework. A polarization electric field exists inside the negative electrode framework. A direction of the polarization electric field is directed from a surface of the negative electrode to the negative current collector. A material of the negative electrode framework includes at least one of a piezoelectric polymer, piezoelectric ceramic, or piezoelectric monocrystal. The negative electrode plate can control lithium deposition sites, effectively suppress the growth of lithium dendrites, effectively mitigate volume expansion of the electrochemical device, and further improve cycle performance of the electrochemical device.

15 Claims, 1 Drawing Sheet

(51) Int. Cl.

| | | |
|---|---|---|
| *H01M 4/134* | (2010.01) | |
| *H01M 4/38* | (2006.01) | |
| *H01M 10/052* | (2010.01) | |

(52) U.S. Cl.
CPC .... *H01M 10/052* (2013.01); *H01M 2004/021* (2013.01); *H01M 2004/027* (2013.01)

(58) Field of Classification Search
CPC ............. H01M 2004/027; H01M 4/62; H01M 10/4235; H01M 4/13; H01M 4/139; H01M 4/667; H01M 10/0525; Y02E 60/10

See application file for complete search history.

(56) References Cited

FOREIGN PATENT DOCUMENTS

| CN | 105789559 A | 7/2016 |
|---|---|---|
| CN | 108134049 A | 6/2018 |
| CN | 112047756 A | 12/2020 |
| KR | 20160059013 A | 5/2016 |
| NL | 2023666 B1 | 4/2021 |
| WO | 2004095604 A2 | 11/2004 |
| WO | WO-2021034197 A1 * | 2/2021 .......... H01M 10/052 |

OTHER PUBLICATIONS

Gao et al., Piezoelectric Mechanism and a Compliant Film to Effectively Suppress Dendrite Growth, 2020, 12, 51448-51458 (Year: 2020).*

ISR for International Application PCT/CN2021/084579 mailed Dec. 29, 2021.

Written Opinion for International Application PCT/CN2021/084579 mailed Dec. 29, 2021.

Extended European Search Report for Application No. PCT/CN2021/084579, mailed on Feb. 3, 2023, 7 pages.

Chinese Office Action 1 for Application No. 202180004679.X, mailed on Mar. 25, 2023, 7 pages.

Chinese Office Action 2 for Application No. 202180004679.X, mailed on Sep. 14, 2023, 6 pages.

* cited by examiner

NEGATIVE ELECTRODE PLATE, ELECTROCHEMICAL DEVICE CONTAINING SAME, AND ELECTRONIC DEVICE

CROSS REFERENCE TO RELATED APPLICATIONS

The present application is a Continuation of PCT application PCT/CN2021/084579 filed on Mar. 31, 2021, the disclosure of which is hereby incorporated by reference in its entirety.

TECHNICAL FIELD

This application relates to the electrochemical field, and in particular, to a negative electrode plate, an electrochemical device containing same, and an electronic device.

BACKGROUND

By virtue of the advantages of a high energy storage density, a high open circuit voltage, a low self-discharge rate, a long cycle life, and high safety, lithium-ion batteries are widely used in various fields such as electric energy storage, mobile electronic devices, electric vehicles, and aerospace equipment. As the mobile electronic devices and the electric vehicles enter a stage of rapid development, the market is posing higher requirements on the energy density, cycle performance, and kinetics performance of the lithium-ion batteries. Among the performance indicators, a volumetric energy density and a mass energy density are important parameters for measuring battery performance.

Among all metal elements, lithium metal is a metal with the smallest relative atomic mass (6.94 g/mol) and the lowest standard electrode potential (−3.045 V). A theoretical gram capacity of the lithium metal is up to 3860 mAh/g. Therefore, by using the lithium metal as a negative electrode of the battery accompanied by positive materials of a high energy density, the energy density of the battery and the working voltage of the battery can be increased significantly. However, during the charging and discharging of a lithium metal battery, lithium deposition causes volume expansion. In addition, because a current density and a concentration of lithium ions in an electrolytic solution are inhomogeneous, the lithium ions deposit too fast at some sites, thereby forming lithium dendrite structures. The lithium dendrite structures severely affect the efficiency, cycle life, and energy density of the lithium metal battery. Moreover, sharp lithium dendrites are very prone to pierce a separator and directly contact a positive electrode to form a short circuit and cause serious safety problems. Therefore, it is urgent for a person skilled in the art to develop a method for suppressing growth of lithium dendrites to mitigate expansion and improve cycle performance of the lithium metal battery.

SUMMARY

An objective of this application is to provide a negative electrode plate, an electrochemical device containing same, and an electronic device to mitigate volume expansion and improve cycle performance of the electrochemical device.

It needs to be noted that in the content of tins application, this application is construed by using a lithium metal battery as an example of the electrochemical device, but the electrochemical device according to this application is not limited to the lithium metal battery. Specific technical solutions are as follows:

A first aspect of this application provides a negative electrode plate. The negative electrode plate includes a negative current collector, a lithium metal negative electrode, and a negative electrode framework. A polarization electric field exists inside the negative electrode framework. A direction of the polarization electric field is directed from a surface of the negative electrode to the negative current collector. A material of the negative electrode framework includes at least one of a piezoelectric polymer, piezoelectric ceramic, or piezoelectric monocrystal.

In this application, the negative electrode framework can provide a sufficient and steady space for lithium metal deposition. Therefore, drastic volume changes of a negative electrode caused by the migration of lithium ions between a positive electrode and the negative electrode are avoided during charging and discharging, the density of lithium deposition is unproved effectively, and the growth of lithium dendrites is suppressed. During the charging and discharging of the lithium metal battery, a current density and a concentration of lithium ions in an electrolytic solution are inhomogeneous. Consequently, a deposition speed at some points is too fast in a lithium deposition process, and then sharp dendrite structures are formed. The sharp lithium dendrites are prone to pierce a separator and directly contact the positive electrode to form a short circuit and cause serious safety accidents. A polarization electric field exists inside the negative electrode framework, and can not only homogenize the current density distribution in the lithium metal negative electrode or on an electrolyte interface, but also controllably induce a migration direction of lithium ions. In this way, the lithium metal can deposit in a homogeneous, orderly, and controllable manner, thereby suppressing the growth of lithium dendrites. A direction of the polarization electric field is directed from a surface of the negative electrode to the negative current collector, that is, directed from the surface that is of the negative electrode plate and that is away from the negative current collector side to the negative current collector. In this direction, the lithium ions transmitted from the electrolytic solution are induced to migrate from the surface of the negative electrode to the negative current collector side. In this way, the lithium metal is controlled to deposit from the negative current collector side in a bottom-up direction, thereby controlling the lithium deposition sites, suppressing the growth of lithium dendrites, mitigating the volume expansion of the lithium metal battery, and further improving the cycle performance of the lithium metal battery. It needs to be noted that in the "deposit in a bottom-up direction" in this application, the side close to the negative current collector is referred to as "down", and the other side away from the negative current collector is referred to as "up". Understandably, the negative electrode framework in this application is a three-dimensional structure, in which a space is available for accommodating lithium metal.

In this application, the material of the negative electrode framework includes at least one of a piezoelectric polymer, piezoelectric ceramic, or piezoelectric monocrystal. The negative electrode framework that generates a piezoelectric effect is prepared by selecting the foregoing material, so that a polarization electric field exists inside the negative electrode framework. Therefore, the lithium metal is induced to deposit in an orderly manner by using the direction of the electric field, thereby preventing the generation of lithium dendrites. The material of the negative electrode framework is insulative and elastic. The insulative negative electrode framework can prevent the lithium metal from directly depositing inside the framework body, that is, being intercalated in the framework body, but can induce the lithium metal to deposit in a space formed by the negative electrode framework, thereby further implementing orderly deposition of the lithium metal and reducing the volume expansion of the lithium metal negative electrode. The elastic negative electrode framework can provide a sufficient and steady space for lithium metal deposition, and reduce the volume change of the lithium metal negative electrode. Preferably, the material of the negative electrode framework includes any one of a piezoelectric polymer, piezoelectric ceramic, or piezoelectric monocrystal. Therefore, the material of the negative electrode framework is consistent, and the electric field distribution inside the negative electrode framework is mare homogeneous. In this way, the lithium deposition is more homogeneous, and the growth of lithium dendrites is suppressed more effectively. In this application, the term "piezoelectric effect" means that when a dielectric is deformed by an external force received in a specific direction, polarization occurs inside the dielectric, and opposite charges, positive and negative, appear on two opposite surfaces of the dielectric.

Overall, the negative electrode plate according to this application includes a negative current collector, a lithium metal negative electrode, and a negative electrode framework. A polarization electric field exists inside the negative electrode framework. The direction of the polarization electric field is directed from a surface of the negative electrode to the negative current collector. The material of the negative electrode framework includes at least one of a piezoelectric polymer, piezoelectric ceramic, or piezoelectric monocrystal. The negative electrode plate can control lithium deposition sites and effectively suppress the growth of lithium dendrites, thereby greatly mitigating volume expansion of the lithium metal battery and further improving the cycle performance of the lithium metal battery. Further, the negative electrode plate can avoid the generation of sharp lithium dendrites that pierce the separator and that directly contact the positive electrode to form a short circuit, thereby improving the safety performance of the lithium metal battery.

In some embodiments of this application, a mom-temperature coercive field strength Ec of the material of the negative electrode framework satisfies: $0 \text{ kV/mm}<Ec<100 \text{ kV/mm}$. For example, a lower limit of the room-temperature coercive field strength Ec may be, but is not limited to, 1 kV/mm, 10 kV/mm, 20 kV/mm, 30 kV/mm, or 40 kV/mm; and an upper limit of the room-temperature coercive field strength Ec may be, but is not limited to, 50 kV/mm, 60 kV/mm, 70 kV/mm, 80 kV/mm, 90 kV/mm, or 99 kV/mm. Without being limited to any theory, if the room-temperature coercive field strength Ec of the material of the negative electrode framework is too high (for example, higher than 100 kV/mm), the polarization electric field required by the material is too large, and it is difficult to generate a polarization electric field inside the negative electrode framework. In this application, the term "room-temperature coercive field strength" means an electric field strength that makes the polarization disappear under a room temperature when the material is in the electric field.

In an embodiment of this application, a person skilled in the art understands that, the strength of the polarization electric field is selected depending on the room-temperature coercive field strength Ec of the material of the negative electrode framework. The strength of the polarization electric field is preferably 0.1 to 6 times the room-temperature coercive field strength Ec. For example, a lower limit of the strength of the polarization electric field may be, but is not limited to, 0.1, 1, 2, 2.9, or 3 times the room-temperature coercive field strength Ec; and an upper limit of the strength of the polarization electric field may be, but is not limited to, 4, 5, or 6 times the room-temperate coercive field strength Ec. Without being limited to any theory, if the strength of the polarization electric field is too low (for example, lower than 0.1 times the mom-temperature coercive field strength Ec), a polarization electric field is unable to be generated inside the negative electrode framework. If the strength of the polarization electric field is too high (for example, higher than 6 times the room-temperature coercive field strength Ec), the negative electrode framework will break down and fail. With the strength of the polarization electric field controlled to be within the foregoing range, an orderly electric field in a specific direction can be generated inside the negative electrode framework to regulate the lithium deposition sites and suppress the generation of lithium dendrites.

In an embodiment of this application, the type of the piezoelectric polymer is not particularly limited, as long as the objectives of this application can be achieved. For example, the piezoelectric polymer may include polyvinylidene difluoride (PVDF), a vinylidene difluoride-trifluoroethylene copolymer, a vinylidene difluoride-tetrafluoroethylene copolymer, a vinylidene dicyanide-vinyl acetate copolymer (P(VDCN-VAC)), a vinylidene dicyanide-vinyl benzoate copolymer (P(VDCN-VBz)), a vinylidene dicyanide-vinyl propionate copolymer (P(VDCN-VPr)), a vinylidene dicyanide-vinyl pivalate copolymer (P(VDCN-VPiv)), a vinylidene dicyanide-methyl methacrylate copolymer (P(VDCN-MMA)), a vinylidene dicyanide-isobutylene copolymer (P(VDCN-IB)), or a nylon-odd number piezoelectric polymer $-(HN-(CH_2)_x-CO-)_n-$, where x is an even number within 2 to 10, and n is an integer within 90 to 400. When n is greater than 400, a molecular weight of $-(HN-(CH_2)_x-CO-)_n-$ is too large, thereby increasing the processing difficulty drastically. In this application, a weight-average molecular weight of the piezoelectric polymer is not particularly limited, and may be selected by a person skilled in the art depending on the actual situation, as long as the objectives of this application can be achieved.

In an embodiment of this application, the type of the piezoelectric ceramic is not particularly limited, as long as the objectives of this application can be achieved. For example, the piezoelectric ceramic includes at least one of barium titanate ($BaTiO_3$), lead titanate ($PbTiO_3$), lithium niobate ($LiNbO_3$), lithium tantalate ($LiNbO_3$), lead zirconate titanate $PbZr_yTi_{1-y}O_3$, lead magnesium niobate $PbMg_zNb_{1-z}O_3$, lead zinc niobate $PbZn_vNb_{1-v}O_3$, or lead manganese antimonate $PbMn_wSb_{1-w}O_3$ or $Pb_{1-s}M(Zr_t Ti_{1-t})_{1-(s/4)}O_3$ or the like, where $0<y<1$, $0<z<1$, $0<v<1$, $0<w<1$, $0<s<1$, $0<t<1$, and M is a rare earth element and may include any one of Y, La, Ce, Nd, Sm, Eu, Gd, or Dy, and the like.

In an embodiment of this application, the type of the piezoelectric monocrystal is not particularly limited, as long as the objectives of this application can be achieved. For example, the piezoelectric monocrystal may include quartz monocrystal, tellurium oxide monocrystal, bismuth germanate monocrystal ($Bi_{12}GeO_{20}$), lithium iodate monocrystal ($LiIO_3$), aluminum orthophosphate monocrystal ($AlPO_4$), lanthanum gallium silicate monocrystal ($La_3Ga_5SiO_{14}$), barium titanate monocrystal ($BaTiO_3$), or lead zirconate titanate monocrystal $PbZr_eTi_{1-e}O_3$, or the like, where $0<e<1$.

In an embodiment of this application, the porosity of the negative electrode framework is 5% to 90%, and preferably, 40% to 90%. For example, a lower limit of the porosity of the negative electrode framework may be, but is not limited to, 5%, 15%, 25%, 35%, 40%, or 45%; and an upper limit of the porosity of the negative electrode framework may be, but is not limited to, 55%, 65%, 75%, 85%, or 90%. Without being limited to any theory, if the porosity of the negative electrode framework is too low (for example, lower than 5%), the space available for accommodating lithium metal is too small during lithium deposition in a charging process, thereby being prone to cause volume expansion of the negative electrode. If the porosity of the negative electrode framework is too high (for example, higher than 90%), the negative electrode framework is not strong enough for maintaining structural stability, thereby affecting the electrochemical performance of the lithium metal battery. With the porosity of the negative electrode framework controlled to be within the foregoing range, it is ensured that in the charging process of the lithium metal battery, the space in the negative electrode framework is enough for lithium metal deposition, and the structural stability of the negative electrode framework is maintained. The negative electrode framework with the porosity falling within the preferred range can more effectively mitigate the volume expansion and improve the electrochemical performance of the lithium metal battery.

In an embodiment of this application, a thickness of the negative electrode framework is 1 μm to 200 μm, preferably 5 μm to 200 μm, and more preferably, 30 μm to 100 μm. For example, a lower limit of the thickness of the negative electrode framework may be, but is not limited to, 1 μm, 2 μm, 3 μm, 5 μm, 10 μm, 20 μm, 30 μm, 50 μm, or 100 μm; and an upper limit of the thickness of the negative electrode framework may be, but is not limited to, 110 μm, 130 μm, 150 μm, 180 μm, or 200 μm. Without being limited to any theory, when the thickness of the negative electrode framework is too small (for example, less than 1 μm), the negative electrode framework is too thin, not strong enough, and is prone to rupture, and the safety performance of the lithium metal battery is affected. In addition, in the negative electrode framework, the space available for storing lithium metal is too small, thereby being unable to mitigate the volume expansion and improve the cycle performance of the lithium metal battery. When the thickness of the negative electrode framework is too great (for example, greater than 200 μm), the volume of the lithium metal battery increases and the energy density of the lithium metal battery decreases. With the thickness of the negative electrode framework controlled to be within die foregoing range, a sufficient and stable space is available for lithium metal deposition, thereby mitigating the volume expansion of the lithium metal battery and further improving the cycle performance and safety performance of the lithium metal battery. The negative electrode framework of a thickness fatling within the foregoing preferred range is more effective in mitigating die volume expansion and improving the cycle performance and safety performance of the lithium metal battery.

In this application, the strength of the negative electrode framework is not particularly limited, as long as die negative electrode framework does not collapse during the charging and discharging of the battery, and as long as the objectives of this application can be achieved. For example, when the negative electrode framework is prepared by means of piezoelectric polymer electrospinning, the strength of a single fiber may be greater than 200 GPa, so that the negative electrode framework maintains a relatively high strength as a whole.

In an embodiment of this application, a conductivity of the negative electrode framework is less than $10^{-10}$ S/cm. With the conductivity of the negative electrode framework controlled to be within the foregoing range, the current density of the lithium metal negative electrode or the electrolyte interface can be effectively controlled, thereby regulating the lithium metal deposition and suppressing the growth of lithium dendrites.

In an embodiment of this application, the negative electrode framework may include a powder framework or a film framework. The powder framework may include at least one of powder of a piezoelectric polymer, powder of piezoelectric ceramic, or powder of a piezoelectric monocrystal, or the like. The film framework may include at least one of a piezoelectric polymer, piezoelectric ceramic, piezoelectric monocrystal, or an inorganic piezoelectric film, and the like. In this application, the type of the negative electrode framework in the lithium metal battery is not particularly limited. A person skilled in the art may select a powder framework or a film framework depending on the actual situation, as long as the objectives of this application can be achieved.

In an embodiment of this application, the type of the inorganic piezoelectric film is not particularly limited, as long as the objectives of this application can be achieved. For example, the inorganic piezoelectric film may include metal oxide, nitride, carbide, or an intermetallic compound, and the like. Specifically, the inorganic piezoelectric film may include metal oxide, nitride, carbide, or an intermetallic compound, which, in each case, possesses a piezoelectric nature. The metal oxide may include zinc oxide, bismuth oxide, cobalt oxide, lead oxide, nickel oxide, chromium oxide, antimony oxide, or the like. The nitride may include AlN, AlGaN, InAlN, GaN, InGaN, or InN, or the like. The carbide includes SiC or the like. The intermetallic compound includes $Ti_3Al$, TiAl, or the like. The inorganic piezoelectric film may further include a thin film or a monocrystal sheet made of the foregoing piezoelectric ceramic, or the like.

The negative electrode plate in this application includes a negative current collector, a lithium metal negative electrode, and a negative electrode framework. In this application, the negative current collector is not particularly limited as long as the objectives of this application can be achieved. For example, the negative current collector includes a copper foil, a copper alloy foil, a nickel foil, a stainless steel foil, a titanium foil, foamed nickel, foamed copper, or a composite current collector, or the like. The lithium metal negative electrode may include a lithium metal sheet directly disposed on the negative current collector, or may include the lithium metal stored in an internal space of the negative electrode framework after the negative electrode plate is pre-replenished with lithium electrochemically. In this application, the thicknesses of the negative current collector and the lithium metal negative electrode are not particularly limited as long as the objectives of this application can be achieved. For example, the thickness of the negative current collector is 6 μm to 10 μm, and the thickness of the lithium metal negative electrode is 30 μm to 120 μm. In this application, the thickness of the negative electrode plate is not particularly limited as long as the objectives of this application can be achieved. For example, the thickness of the negative electrode plate is 50 μm to 150 μm. Optionally, the negative electrode plate may further include a conductive layer. The conductive layer is located between the negative current collector and the lithium metal negative electrode. The composition of the conductive layer is not particularly limited, and may be a conductive layer commonly used in the art. The conductive layer includes a conductive agent and a binder.

The positive electrode plate in this application is not particularly limited as long as the objectives of this application can be achieved. For example, the positive electrode plate generally includes a positive current collector and a positive material layer. In this application, the positive current collector is not particularly limited as long as the objectives of tins application can be achieved. For example, the positive current collector may include an aluminum foil, an aluminum alloy foil, a composite current collector, or the like. The positive material layer includes a positive active material. The positive active material is not particularly limited as long as the objectives of this application can be achieved. For example, die positive active material may include at least one of lithium nickel cobalt manganese oxide (811, 622, 523, 111), lithium nickel cobalt aluminum oxide, lithium iron phosphate, a lithium-rich manganese-based material, lithium cobaltate, lithium manganate, lithium manganese iron phosphate, or lithium titanate. In this application, the thicknesses of the positive current collector and the positive material layer are not particularly limited as long as the objectives of this application can be achieved. For example, the thickness of the positive current collector is 5 $\mu$m to 20 $\mu$m, and preferably, 6 $\mu$m to 18 $\mu$m, and more preferably, 8 $\mu$m to 16 $\mu$m. The thickness of the positive material layer is 30 $\mu$m to 120 $\mu$m. Optionally, the positive electrode plate may further include a conductive layer. The conductive layer is located between the positive current collector and the positive material layer. The composition of the conductive layer is not particularly limited, and may be a conductive layer commonly used in the art. The conductive layer includes a conductive agent and a binder.

The conductive agent is not particularly limited as long as the objectives of this application can be achieved. For example, the conductive agent may include at least one of conductive carbon black (Super P), carbon nanotubes (CNTs), carbon nanofibers, flake graphite, acetylene black, carbon black, Ketjen black, carbon dots, or graphene, or the like. The binder is not particularly limited, and may be any binder well known in the an, as long as the objectives of this application can be achieved. For example, the binder may include at least one of polypropylene alcohol, sodium polyacrylate, potassium polyacrylate, lithium polyacrylate, polyimide, polyamide imide, styrene butadiene rubber (SBR), polyvinyl alcohol (PVA), polyvinylidene fluoride, polyvinylidene difluoride (PVDF), polytetrafluoroethylene (PTFE), polyvinyl butyral (PVB), water-based acrylic resin, carboxymethyl cellulose (CMC), or sodium carboxymethyl cellulose (CMC-Na), or the like.

The separator in this application is not particularly limited as long as the objectives of this application can be achieved. For example, the separator may be at least one of: a polyethylene (PE)- and polypropylene (PP)-based polyolefin (PO) separator, a polyester film (such as polyethylene terephthalate (PET) film), a cellulose film, a polyimide film (PI), a polyamide film (PA), a spandex or aramid film, a woven film, a non-woven film (non-woven fabric), a microporous film, a composite film, separator paper, a laminated film, or a spinning film. For example, the separator may include a substrate layer and a surface treatment layer. The substrate layer may be a non-woven fabric, film or composite film, which, in each case, is porous. The material of the substrate layer may include at least one of polyethylene, polypropylene, polyethylene terephthalate, polyimide, or the like. Optionally, the substrate layer may be a polypropylene porous film, a polyethylene porous film, a polypropylene non-woven fabric, a polyethylene non-woven fabric, or a polypropylene-polyethylene-polypropylene porous composite film. Optionally, a surface treatment layer is disposed on at least one surface of the substrate layer. The surface treatment layer may be a polymer layer or an inorganic compound layer, or a layer formed by mixing a polymer and an inorganic compound. For example, the inorganic compound layer includes inorganic particles and a binder. The inorganic particles are not particularly limited, and may be at least one selected from: aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, barium sulfate, or the like. The binder is not particularly limited, and may be one or more selected from polyvinylidene fluoride, vinylidene fluoride-hexafluoropropylene copolymer, polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, or polyhexafluoropropylene. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride, poly(vinylidene fluoride-hexafluoropropylene), or the like.

The lithium metal battery according to this application further includes an electrolyte. The electrolyte may be at least one of a gel electrolyte, a solid-state electrolyte, and an electrolytic solution. The electrolytic solution includes a lithium salt and a nonaqueous solvent. In some embodiments of this application, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiSiFe, LiBOB, LiTFSI, or lithium difluoroborate. For example, the lithium salt may be LiTFSI because it provides a high ionic conductivity and improves cycle characteristics. The nonaqueous solvent may be at least one of a carbonate compound, a carboxylate compound, an ether compound, or another organic solvent. The carbonate compound may be a chain carbonate compound, a cyclic carbonate compound, a fluorocarbonate compound, or any combination thereof. Examples of the chain carbonate compound are dimethyl carbonate (DMC), diethyl carbonate (DEC), dipropyl carbonate (DPC), methyl propyl carbonate (MPC), ethylene propyl carbonate (EPC), ethyl methyl carbonate (EMC), or any combinations thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combinations thereof. Examples of the carboxylate compound are methyl formate, methyl acetate, ethyl acetate, n-propyl acetate, tert-butyl acetate, methyl propionate, ethyl propionate, propyl propionate, $\gamma$-butyrolactone, decanolactone, valerolactone, mevalonolactone, caprolactone, or any combinations thereof. Examples of the ether compound are dibutyl ether, tetraglyme, diglyme, 1,2-dimethoxyethane, 1,2-diethoxyethane, ethoxy-methoxyethane, 2-methyltetra-hydrofuran, tetrahydrofuran, or any combination thereof. Examples of the other organic solvent are at least one of dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, or phosphate ester.

In this application, the outer package is not particularly limited as long as the objectives of this application can be achieved. For example, the outer package may include an inner layer and an outer layer. The inner layer is hermetically connected to a bipolar current collector. Therefore, the material of the inner layer may include a polymer material, so as to achieve an excellent sealing effect. In addition, the combination of the inner layer and the outer layer can effectively protect an internal structure of the electrochemical device. In this application, the material of the inner layer is not particularly limited as long as the objectives of this application can be achieved. For example, the material of the inner layer includes at least one of polypropylene, polyester, p-hydroxybenzaldehyde, polyamide, polyphenylene ether, polyurethane, or the like. In this application, the material of the outer layer is not particularly limited as long as the objectives of this application can be achieved. For example, the material of the outer layer includes at least one of an aluminum foil, an aluminum oxide layer, a silicon nitride layer, or the like. For example, the outer package may be an aluminum plastic film, and the aluminum plastic film includes a nylon layer, an aluminum foil layer, and a PP layer. In this application, the thickness of the outer package is not particularly limited as long as the objectives of this application can be achieved. For example, the thickness of the outer package may be 60 μm to 500 μm, preferably 60 μm to 300 μm, and more preferably, 60 μm to 200 μm. The outer package of the foregoing thickness can effectively protect the internal structure of the electrochemical device.

In this application, the preparation of the film negative electrode framework is not particularly limited. In an embodiment, a PVDF fiber film of a specific thickness may be prepared by using polyvinylidene difluoride (PVDF) as a precursor based on an existing electrospinning technique. The PVDF fiber film is placed in a vacuum oven, and dried to obtain a negative electrode framework.

In this application, the preparation of the powder negative electrode framework is not particularly limited. In an embodiment, for example, the PVDF powder may be dispersed in N-methyl-pyrrolidone (NMP), and then one surface of the lithium metal negative electrode is coated with the NMP by using a doctor blade. The lithium metal negative electrode is dried in a vacuum oven at 80° C. to obtain a negative electrode framework.

A second aspect of this application provides an electrochemical device, including the negative electrode plate according to this application. The electrochemical device achieves excellent volume expansion performance and cycle performance.

The electrochemical device in this application is not particularly limited, and may be any device in which an electrochemical reaction occurs. In some embodiments, the electrochemical device may include, but is not limited to, a lithium metal secondary battery, a lithium-ion secondary battery (lithium-ion battery), a lithium polymer secondary battery, a lithium-ion polymer secondary battery, or the like.

A third aspect of this application provides an electronic device. The electronic device includes the electrochemical device according to an embodiment of this application. The electronic device achieves excellent volume expansion performance and cycle performance.

The electronic device according to this application is not particularly limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household storage battery, and the like.

The preparation process of the electrochemical device is well known to a person skilled in the art, and is not particularly limited in this application. For example, a process of manufacturing the electrochemical device may include: stacking a positive electrode plate and a negative electrode plate that are separated by a separator, fixing four corners of the stacked structure as required, placing the stacked structure into a housing, injecting an electrolytic solution into the housing, and sealing the housing. In addition, an overcurrent prevention element, a guide plate, and the like may be placed into the housing as required, so as to prevent the rise of internal pressure, overcharge, and over-discharge of the electrochemical device.

This application provides a negative electrode plate, an electrochemical device containing same, and an electronic device. The negative electrode plate includes a negative current collector, a lithium metal negative electrode, and a negative electrode framework. A polarization electric field exists inside the negative electrode framework. The direction of the polarization electric field is directed from a surface of the negative electrode to the negative current collector. The material of the negative electrode framework includes at least one of a piezoelectric polymer, piezoelectric ceramic, or piezoelectric monocrystal. The negative electrode plate can control lithium deposition sites, effectively suppress the growth of lithium dendrites, effectively mitigate the volume expansion of the electrochemical device, and further improve the cycle performance of the electrochemical device. In addition, the safety performance of the electrochemical device can be effectively improved.

BRIEF DESCRIPTION OF DRAWINGS

To describe the technical solutions in this application or the prior art more clearly, the following outlines the drawings to be used in the embodiments of this application or the prior art. Evidently, the drawings outlined below are merely a part of embodiments of this application.

Figure 1:
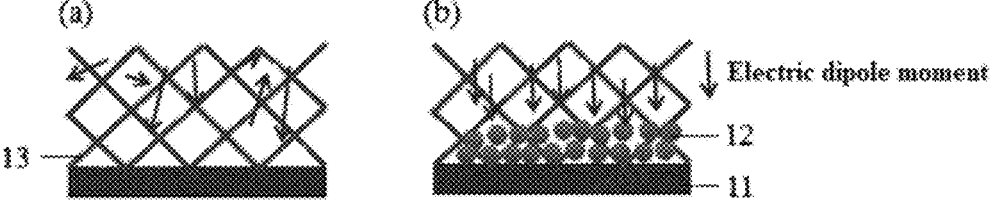
FIG. 1 is a schematic diagram (cross-sectional view) of a negative electrode plate according to an embodiment of this application.

Reference numerals: 11. Negative current collector; 12. Lithium metal; and 13. Negative electrode framework.

DETAILED DESCRIPTION

To make the objectives, technical solutions, and advantages of this application clearer, the following describes this application in further detail with reference to drawings and embodiments. Evidently, the described embodiments are merely a part of but not all of the embodiments of this application. All other embodiments derived by a person of ordinary skill in the an based on the embodiments of this application without making any creative efforts fall within the protection scope of this application.

It needs to be noted that in the specific embodiments of this application, this application is construed by using a lithium metal battery as an example of the electrochemical device, but the electrochemical device according to this application is not limited to the lithium metal battery.

FIG. 1 shows a schematic diagram (cross-sectional view) of a negative electrode plate according to an embodiment of this application. FIG. 1(*a*) is a schematic diagram of the negative electrode plate before polarization, and FIG. 1(*b*) is a schematic diagram of the negative electrode plate after polarization. As shown in FIG. 1, in the negative electrode plate before polarization, no polarization electric field within the range specified in this application exists inside the negative electrode framework 13, in which the distribution of positive and negative charges is untidy and disordered. In the negative electrode plate after polarization, a polarization electric field exists inside the negative electrode framework 13, in which the positive and negative charges are distributed in a homogeneous and orderly manner. The lithium metal 12 is homogeneously deposited from the negative current collector 11 side in a bottom-up direction.

Figure 2:
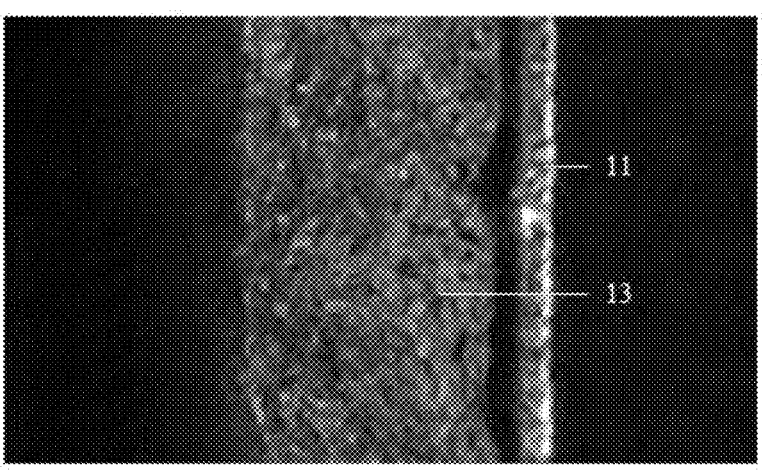
FIG. 2 is an optical microscope image of a cross section of a negative electrode plate according to an embodiment of this application.

FIG. 2 shows an optical microscope image of a cross section of a negative electrode plate according to an embodiment of this application, in which a magnification is 500×. As shown in FIG. 2, a negative electrode framework 13 is disposed on a first side of the negative electrode current collector 11. Lithium metal is electrochemically pre-replenished in the internal space of the negative electrode framework 13. A person skilled in the art understands that the negative electrode framework 13 may be disposed in the entire region on a first side of the negative current collector 11 or disposed in a partial region on one side (the first side) of the negative current collector 11. Alternatively, the negative electrode framework 13 may be disposed in the entire region or a partial region on the other side (a second side) of the negative current collector 11.

EMBODIMENT

The implementations of this application are described below in more detail with reference to embodiments and comparative embodiments. Various tests and evaluations are performed in accordance with the following methods. In addition, unless otherwise specified, "fraction" and "%" are a percent by mass.

Test Methods and Devices:

Testing a Full-Charge Expansion Rate:

Measuring a thickness of a half-charged lithium metal battery with a spiral micrometer. When the lithium metal battery is in a fully charged state after being charged and discharged for 400 cycles, measuring the thickness of the lithium metal battery again with the spiral micrometer. Comparing the measured thickness with the thickness of the initial half-charged lithium metal battery to obtain an expansion rate of the fully charged lithium metal battery.

Testing Cycle Performance:

Charging the battery at a constant current of 0.7 C under a 25° C. temperature until the voltage reaches 4.3 V, charging the battery at a constant voltage until the current reaches 0.025 C, leaving the battery to stand for 5 minutes, and then discharging the battery at a current of 0.5 C until the voltage reaches 2.8 V. Performing a cycle test in which the battery is charged at 0.7 C and discharged at 0.5 C by using the capacity obtained in this step as an initial capacity, comparing the capacity obtained in each step with the initial capacity to obtain a plurality of ratios, and obtaining a capacity attenuation curve based on the ratios. When the capacity retention rate reaches 90% in the cycle test under 25° C. recording the number of cycles as the room-temperature cycle performance of the lithium metal battery.

Testing a Room-Temperature Coercive Field Strength Ec:

Measuring a coercive field strength Ec of the material of the negative electrode framework by using a TF Analyzer 2000 ferroelectric analyzer manufactured by aixACCT. Preparing a 100 μm-thick piezoelectric film sample of a 50 mm×50 mm size, and placing the sample under a probe in a test platform of the analyzer. Running the Yster-esis Software program, inputting dimensional parameters of the sample, setting a polarization voltage based on the properties of the material, where the highest polarization voltage is 4000 V. Performing a test to obtain a corresponding value of the coercive field strength Ec.

Embodiment 1

<Preparing an Electrolytic Solution>

Mixing dioxolane (DOL) and dimethyl ether (DME) at a volume ratio of DOL:DME=1:1 in a dry argon atmosphere to obtain a mixed solvent adding lithium bis(trifluoromethanesulfonyl)imide (LiTFSI) serving as a lithium salt into the mixed solvent, and letting the lithium salt be dissolved and mixed evenly to obtain an electrolytic solution in which a lithium salt concentration is 1 mol/L.

<Preparing a Negative Electrode Plate>

(a) <Preparing a Film Negative Electrode Framework>

Preparing a 10 μm-thick PVDF fiber film by using PVDF as a precursor based on an electrospinning technique, and keeping the PVDF fiber film in a vacuum oven under 80° C. for 12 hours to obtain a 10 μm-thick negative electrode framework. A porosity of the negative electrode framework is 85%.

(b) <Combining a Negative Electrode Framework with a Lithium Metal Negative Electrode>

Performing pre-replenishment of lithium electrochemically by using a 0.05 mm-thick lithium sheet as a lithium source. Selecting a 15 μm-thick PE separator, placing the negative electrode framework and the lithium metal on two sides of the separator respectively, with both the negative electrode framework part and the lithium metal part facing the separator directly. In this way, a lithium replenishment battery is assembled for electrochemical replenishment of lithium, where the electrolytic solution is the same as the electrolytic solution described in <Preparing an electrolytic solution>, the lithium replenishment device is a LAND brand (model: CT2001A) of a 5 V and 5 mA specification, the lithium replenishment current is 0.2 mA/cm², the discharge duration is 15.5 hours, and the amount of lithium replenishment is 3.1 mAh/cm². After the pre-replenishment of lithium is completed, a negative electrode framework containing lithium metal is obtained.

(c) <Polarizing a Negative Electrode Framework>

Placing the prepared negative electrode framework in a parallel electric field to undergo air polarization, where the strength of the polarization electric field is 10 kV/mm, the polarization time is 30 minutes one side of the negative electrode framework faces a positive voltage side, and the other side to be combined with the negative current collector faces a negative voltage side. The room-temperature coercive field strength Ec of the PVDF is 50 kV/mm.

(d) <Combining a Negative Electrode Framework with a Negative Current Collector>

In a dry argon atmosphere, placing the negative electrode framework containing the lithium metal negative electrode on one side of the 10 μm-thick negative current collector copper foil, hot calendering to combine the other side of the negative electrode framework with the negative current

14

The steps of <Preparing an electrolytic solution>, <Preparing a negative electrode plate>, <Preparing a positive electrode plate>, <Preparing a separator>, and <Preparing a lithium metal battery> in Embodiment 2, Embodiment 3, Embodiment 4, Embodiment 5, and Embodiment 6, Embodiment 7, Embodiment 8, and Embodiment 9 are the same as those described in Embodiment 1, and the changes in the relevant preparation parameters are shown in Table 1.

TABLE 1

| Embodiment | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode framework | Manner of combining negative electrode framework with lithium metal |
|---|---|---|---|---|---|---|---|
| 1 | PVDF | 50 | 10 | 85 | 10 | Film | Electrochemical replenishment of lithium |
| 2 | PVDF | 50 | 50 | 85 | 10 | Film | Electrochemical replenishment of lithium |
| 3 | PVDF | 50 | 100 | 85 | 10 | Film | Electrochemical replenishment of lithium |
| 4 | PVDF | 50 | 200 | 85 | 10 | Film | Electrochemical replenishment of lithium |
| 5 | PVDF | 50 | 5 | 85 | 100 | Film | Electrochemical replenishment of lithium |
| 6 | PVDF | 50 | 300 | 85 | 100 | Film | Electrochemical replenishment of lithium |
| 7 | PVDF | 50 | 50 | 85 | 50 | Film | Electrochemical replenishment of lithium |
| 8 | PVDF | 50 | 50 | 85 | 100 | Film | Electrochemical replenishment of lithium |
| 9 | PVDF | 50 | 50 | 85 | 200 | Film | Electrochemical replenishment of lithium | collector, and controlling the hot calendering temperature to be 300° C. and controlling the hot calendering pressure to be 100 kg, so as to obtain a negative electrode plate. Cutting the negative electrode plate into a size of 40 mm×60 mm, welding tabs, and leaving the electrode plate ready for use.

<Preparing a Positive Electrode Plate>

Mixing lithium iron phosphate (LiFePO$_4$) as a positive active material, conductive carbon black (Super P) as a conductive agent, and PVDF as a binder at a mass ratio of 97.5:1.0:1.5, adding NMP as a solvent, blending the mixture into a slurry with a solid content of 75%, and stirring the slurry evenly. Coating a 10 μm-thick positive current collector aluminum foil with the slurry evenly, and drying the slurry at a temperature of 90° C. to obtain a positive electrode plate coated with a positive active material layer on a single side, where the thickness of the positive active material layer is 100 μm. Cutting the positive electrode plate into a size of 38 mm×58 mm after completion of the coating, welding tabs, and leaving the electrode plate ready for use.

<Preparing a Separator>

Using a 15 μm-thick polyethylene (PE) film (manufactured by Celgard) as a separator.

<Preparing a Lithium Metal Battery>

Placing the prepared negative electrode plate in the middle, placing positive electrode plates on two sides of the negative electrode plate respectively, and leaving the negative electrode plate to be adjacent to the positive material layer of the positive electrode plate. Placing a separator between each positive electrode plate and the negative electrode plate. After stacking the plates, fixing four corners of the entire stacked structure, placing the stacked structure into an aluminum plastic film packaging bag, and performing steps such as top-and-side sealing, electrolyte injection, standing, chemical formation, and shaping to obtain a lithium metal battery.

Embodiment 10

(a) <Preparing a Powder Negative Electrode Framework>

Dispersing PVDF powder in NMP, and stirring the NMP to disperse the PVDF evenly to obtain a slurry with a solid content of 12%. Coating one surface (a first surface) of a 30 μm-thick lithium metal negative electrode with the slurry by using a doctor blade, so as to form a 100 μm-thick coating layer. Drying the coating layer in a vacuum oven at 80° C. for 12 hours to obtain a 100 μm-thick negative electrode framework. An average particle diameter of the PVDF powder is 10 μm, and the porosity of the negative electrode framework is 70%.

(b) <Polarizing a Negative Electrode Framework>

Placing the prepared negative electrode framework in a parallel electric field to undergo air polarization, where the strength of the polarization electric field is 50 kV/mm, the polarization time is 30 minutes, the negative electrode framework layer faces a positive voltage side, and a surface (a second surface) of the lithium metal negative electrode containing no negative electrode framework faces a negative voltage side. The room-temperature coercive field strength Ec of the PVDF is 50 kV/mm.

(c) <Combining a Lithium Metal Negative Electrode with a Negative Current Collector>

In a dry argon atmosphere, placing the second surface of the lithium metal negative electrode on a first side of the 10 μm-thick negative current collector copper foil, hot calendering to combine the second surface of the lithium metal negative electrode with the first side of the negative current collector, and controlling the hot calendering temperature to be 300° C. and controlling the hot calendering pressure to be 100 kg, so as to obtain a negative electrode plate. Cutting the negative electrode plate into a size of 40 mm×60 mm, welding tabs, and leaving the electrode plate ready for use.

<Preparing an electrolytic solution>, <Preparing a positive electrode plate>, <Preparing a separator>, and <Preparing a lithium metal battery> are the same as those described in Embodiment 1.

The steps of <Preparing an electrolytic solution>, <Preparing a negative electrode plate>, <Preparing a positive electrode plate>, <Preparing a separator>, and <Preparing a lithium metal battery> in Embodiment 11 and Embodiment 12 are the same as those described in Embodiment 10, and the changes in the relevant preparation parameters are shown in Table 2.

TABLE 2

| Embodiment | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode framework | Manner of combining negative electrode framework with lithium metal |
|---|---|---|---|---|---|---|---|
| 10 | PVDF | 50 | 50 | 70 | 100 | Powder | Negative electrode surface coating |
| 11 | PVDF | 50 | 100 | 70 | 100 | Powder | Negative electrode surface coating |
| 12 | PVDF | 50 | 200 | 70 | 100 | Powder | Negative electrode surface coating |

Embodiment 13

<Preparing a Negative Electrode Plate>
(a) <Preparing a Film Negative Electrode Framework>

Growing a $BaTiO_3$ monocrystal sheet by means of a cosolvent: mixing the $BaTiO_3$ powder, a cosolvent KF, and an oxygenating agent $Fe_2O_3$ evenly at a mass ratio of 97.5:1.0:1.5, putting the mixture into a platinum crucible, heating up to 1175° C. in a high-temperature furnace, thermally insulating for 8 hours, slowly cooling down to 875° C., and then pouring out the molten KF, cooling the KF down to a room temperature at a speed of 10° C. per hour, and melting the remaining KF in the crucible by using 60° C. hot water, thereby obtaining a 10 μm-thick $BaTiO_3$ monocrystal sheet as a negative electrode framework. An average particle diameter of the $BaTiO_3$ powder is 5 μm, and the porosity of the negative electrode framework is 50%.

<Preparing an electrolytic solution>, (b) <Combining a negative electrode framework with a lithium metal negative electrode>, (c) <Polarizing a negative electrode framework>, (d) <Combining a negative electrode framework with a negative current collector>, <Preparing a positive electrode plate>, <Preparing a separator>, and <Preparing a lithium metal battery> are the same as those described in Embodiment 1.

The steps of <Preparing an electrolytic solution>, <Preparing a negative electrode plate>, <Preparing a positive electrode plate>, <Preparing a separator>, and <Preparing a lithium metal battery> in Embodiment 14, Embodiment 15, Embodiment 16, Embodiment 17, Embodiment 18, and Embodiment 19 are the same as those described in Embodiment 13, and the changes in the relevant preparation parameters are shown in Table 3.

TABLE 3

| Embodiment | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode framework | Manner of combining negative electrode framework with lithium metal |
|---|---|---|---|---|---|---|---|
| 13 | BaTiO3 monocrystal sheet | 1 | 0.1 | 50 | 10 | Film | Electrochemical replenishment of lithium |
| 14 | BaTiO3 monocrystal sheet | 1 | 1 | 50 | 10 | Film | Electrochemical replenishment of lithium |
| 15 | BaTiO3 monocrystal sheet | 1 | 3 | 50 | 10 | Film | Electrochemical replenishment of lithium |
| 16 | BaTiO3 monocrystal sheet | 1 | 5 | 50 | 10 | Film | Electrochemical replenishment of lithium |
| 17 | BaTiO3 monocrystal sheet | 1 | 3 | 50 | 50 | Film | Electrochemical replenishment of lithium |
| 18 | BaTiO3 monocrystal sheet | 1 | 3 | 50 | 100 | Film | Electrochemical replenishment of lithium |
| 19 | BaTiO3 monocrystal sheet | 1 | 3 | 50 | 200 | Film | Electrochemical replenishment of lithium |

Embodiment 20

<Preparing a Negative Electrode Plate>

(a) <Preparing a Film Negative Electrode Framework>

Selecting tellurium oxide monocrystal (brand: Physcience Opto-electronics Co., Ltd., Beijing; model: TeO2) as a negative electrode framework. The porosity of the negative electrode framework is 40%, and the thickness of the negative electrode framework is 100 sm.

(c) <Polarizing a Negative Electrode Framework>

The strength of the polarization electric field is 3 kV/mm, the room-temperature coercive field strength Ec is 1.2 kV/mm, and the remainder is the same as in Embodiment 1.

<Preparing an electrolytic solution>, (b) <Combining a negative electrode framework with a lithium metal negative electrode>, (d) <Combining a negative electrode framework with a negative current collector>, <Preparing a positive a solid content of 12%. Coating a first surface of a lithium metal negative electrode with the slurry by using a doctor blade, so as to form a 200 μm-thick coating layer. Drying the coating layer in a vacuum oven at 80° C. to obtain a 100 μm-thick negative electrode framework. An average particle diameter of the $BaTiO_3$ powder is 1 μm, and the porosity of the negative electrode framework is 50%.

<Preparing an electrolytic solution>, (b)<Polarizing a negative electrode framework>, (c) <Combining a lithium metal negative electrode with a negative current collector=, <Preparing a positive electrode plate>, <Preparing a separator>, and <Preparing a lithium metal battery> are the same as those described in Embodiment 10.

The steps of <Preparing an electrolytic solution>, <Preparing a negative electrode plate>, <Preparing a positive electrode plate>, <Preparing a separator>, and <Preparing a lithium metal battery> in Embodiment 23, Embodiment 24, Embodiment 25, and Embodiment 26 are the same as those described in Embodiment 22, and the changes in the relevant preparation parameters are shown in Table 4.

TABLE 4

| Embodiment | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode framework | Manner of combining negative electrode framework with lithium metal |
|---|---|---|---|---|---|---|---|
| 22 | $BaTiO_3$ powder | 1 | 1 | 50 | 100 | Powder | Negative electrode surface coating |
| 23 | $BaTiO_3$ powder | 1 | 3 | 50 | 100 | Powder | Negative electrode surface coating |
| 24 | $BaTiO_3$ powder | 1 | 5 | 50 | 100 | Powder | Negative electrode surface coating |
| 25 | $BaTiO_3$ powder | 1 | 3 | 40 | 100 | Powder | Negative electrode surface coating |
| 26 | $BaTiO_3$ powder | 1 | 3 | 90 | 100 | Powder | Negative electrode surface coating | electrode plate>, <Preparing a separator>, and <Preparing a lithium metal battery> are the same as those described in Embodiment 1.

Embodiment 21

<Preparing a Negative Electrode Plate>

(a) <Preparing a Film Negative Electrode Framework>

Selecting nylon-7 (brand: Formosa Chemicals & Fibre Corporation; model: NP4000) as a negative electrode framework. The porosity of the negative electrode framework is 69%, and the thickness of the negative electrode framework is 50 μm.

(c) <Polarizing a Negative Electrode Framework>

The strength of the polarization electric field is 280 kV/mm, the room-temperature coercive field strength Ec is 97 kV/mm, and the remainder is the same as in Embodiment 1.

<Preparing an electrolytic solution>, (b) <Combining a negative electrode framework with a lithium metal negative electrode>, (d) <Combining a negative electrode framework with a negative current collector>, <Preparing a positive electrode plate>, <Preparing a separator>, and <Preparing a lithium metal battery> are the same as those described in Embodiment 1.

Embodiment 22

<Preparing a Negative Electrode Plate>

(a) <Preparing a Powder Negative Electrode Framework>

Dispersing $BaTiO_3$ powder in NMP, and stirring the NMP to disperse the $BaTiO_3$ powder evenly to obtain a slurry with

Embodiment 27

<Preparing a Negative Electrode Plate>

(a) <Preparing a Powder Negative Electrode Framework>

Placing PbO, $ZrO_2$, and $TiO_2$ at a molar ratio of 5:3:2 into a high-energy planetary ball mill, adding 100 ml of ethanol as a ball-milling agent, and ball-milling at a speed of 250 r/min for 30 hours to obtain lead zirconate titanate $PbZr_{0.6}Ti_{0.4}O_3$ powder. Dispersing $PbZr_{0.6}Ti_{0.4}O_3$ powder in NMP, and stirring the NMP to disperse the $PbZr_{0.6}Ti_{0.4}O_3$ powder evenly to obtain a slurry with a solid content of 12%. Coating a first surface of a 30 μm-thick lithium metal negative electrode with the slurry by using a doctor blade, so as to form a 100 μm-thick coating layer. Drying the coating layer in a vacuum oven at 80° C. to obtain a 100 μm-thick negative electrode framework. An average particle diameter of the $PbZr_{0.6}Ti_{0.4}O_3$ powder is 1 μm, and the porosity of the negative electrode framework is 50%.

(b) <Polarizing a Negative Electrode Framework>

The strength of the polarization electric field is 3 kV/mm, the room-temperature coercive field strength Ec is 0.7 kV/mm, and the remainder is the same as in Embodiment 10.

<Preparing an electrolytic solution>, (b) <Polarizing a negative electrode framework>, (c) <Combining a lithium metal negative electrode with a negative current collector>, <Preparing a positive electrode plate>, <Preparing a separator>, and <Preparing a lithium metal battery> are the same as those described in Embodiment 10.

The steps of <Preparing an electrolytic solution>, <Preparing a negative electrode plate>, <Preparing a positive electrode plate>, <Preparing a separator>, and <Preparing a lithium metal battery> in Comparative Embodiment 1, Comparative Embodiment 2, Comparative Embodiment 3, Comparative Embodiment 4, and Comparative Embodiment 5 are the same as those described in Embodiment 1. The steps of <Preparing an electrolytic solution>, <Preparing a negative electrode plate>, <Preparing a positive electrode plate>, <Preparing a separator>, and <Preparing a lithium metal battery> in Comparative Embodiment 6, Comparative Embodiment 7, Comparative Embodiment 8, and Comparative Embodiment 9 are the same as those described in Embodiment 10. The steps of <Preparing an electrolytic solution>, <Preparing a negative electrode plate>, <Preparing a positive electrode plate>, <Preparing a separator>, and <Preparing a lithium metal battery> in Comparative Embodiment 10, Comparative Embodiment 11, Comparative Embodiment 12, and Comparative Embodiment 13 are the same as those described in Embodiment 13. The steps of <Preparing an electrolytic solution>, <Preparing a negative electrode plate>, <Preparing a positive electrode plate>, <Preparing a separator>, and <Preparing a lithium metal battery> in Comparative Embodiment 14, Comparative Embodiment 15, Comparative Embodiment 16, and Comparative Embodiment 17 are the same as those described in Embodiment 22. The changes in the relevant preparation parameters in the foregoing comparative embodiments are shown in Table 5.

Table 6 shows the preparation parameters in Embodiment 1, Embodiment 2, Embodiment 3, Embodiment 4, Embodiment 5, Embodiment 6, Embodiment 7, Embodiment 8, Embodiment 9, Embodiment 10, Embodiment 11, Embodiment 12, Embodiment 13, Embodiment 14, Embodiment 15, Embodiment 16, Embodiment 17, Embodiment 18, Embodiment 19, Embodiment 20, Embodiment 21, Embodiment 22, Embodiment 23, Embodiment 24, Embodiment 25, Embodiment 26, Embodiment 27, Comparative Embodiment 1, Comparative Embodiment 2, Comparative Embodiment 3, Comparative Embodiment 4, Comparative Embodiment 5, Comparative Embodiment 6, Comparative Embodiment 7, Comparative Embodiment 8, Comparative Embodiment 9, Comparative Embodiment 10, Comparative Embodiment 11, Comparative Embodiment 12, Comparative Embodiment 13, Comparative Embodiment 14, Comparative Embodiment 15, Comparative Embodiment 16, and Comparative Embodiment 17.

TABLE 5

| Comparative Embodiment | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode famework | Manner of combining negative electrode framework with lithium metal |
|---|---|---|---|---|---|---|---|
| 1 | / | / | / | / | / | / | / |
| 2 | PVDF | 50 | 0 | 85 | 10 | Film | Electrochemical replenishment of lithium |
| 3 | PVDF | 50 | −100 | 85 | 10 | Film | Electrochemical replenishment of lithium |
| 4 | PVDF | 50 | −10 | 85 | 10 | Film | Electrochemical replenishment of lithium |
| 5 | PVDF | 50 | −50 | 85 | 10 | Film | Electrochemical replenishment of lithium |
| 6 | PVDF | 50 | 0 | 70 | 100 | Powder | Negative electrode surface coating |
| 7 | PVDF | 50 | −100 | 70 | 100 | Powder | Negative electrode surface coating |
| 8 | PVDF | 50 | −10 | 70 | 100 | Powder | Negative electrode surface coating |
| 9 | PVDF | 50 | −50 | 70 | 100 | Powder | Negative electrode surface coating |
| 10 | BaTiO$_3$ monocrystal sheet | 1 | 0 | 50 | 10 | Film | Electrochemical replenishment of lithium |
| 11 | BaTiO$_3$ monocrystal sheet | 1 | −5 | 50 | 10 | Film | Electrochemical replenishment of lithium |
| 12 | BaTiO$_3$ monocrystal sheet | 1 | −1 | 50 | 10 | Film | Electrochemical replenishment of lithium |
| 13 | BaTiO$_3$ monocrystal sheet | 1 | −3 | 50 | 10 | Film | Electrochemical replenishment of lithium |
| 14 | BaTiO$_3$ powder | 1 | 0 | 50 | 100 | Powder | Negative electrode surface coating |
| 15 | BaTiO$_3$ powder | 1 | −5 | 50 | 100 | Powder | Negative electrode surface coating |
| 16 | BaTiO$_3$ powder | 1 | −1 | 50 | 100 | Powder | Negative electrode surface coating |
| 17 | BaTiO$_3$ powder | 1 | −3 | 50 | 100 | Powder | Negative electrode surface coating |

Note:
"/" in Table 5 indicates that there is no corresponding preparation parameter.

TABLE 6

| | Type of material of negative electrode framework | Room-temperature coercive field strength Ec of material (kV/mm) | Strength of polarization electric field (kV/mm) | Porosity of negative electrode framework (%) | Thickness of negative electrode framework (μm) | Type of negative electrode framework | Quantity of cycles | Volume expansion (%) |
|---|---|---|---|---|---|---|---|---|
| Embodiment 1 | PVDF | 50 | 10 | 85 | 10 | Film | 80 | 65 |
| Embodiment 2 | PVDF | 50 | 50 | 85 | 10 | Film | 105 | 30 |
| Embodiment 3 | PVDF | 50 | 100 | 85 | 10 | Film | 98 | 35 |
| Embodiment 4 | PVDF | 50 | 200 | 85 | 10 | Film | 100 | 30 |
| Embodiment 5 | PVDF | 50 | 5 | 85 | 100 | Film | 78 | 66 |
| Embodiment 6 | PVDF | 50 | 300 | 85 | 100 | Film | 95 | 30 |
| Embodiment 7 | PVDF | 50 | 50 | 85 | 50 | Film | 112 | 25 |
| Embodiment 8 | PVDF | 50 | 50 | 85 | 100 | Film | 120 | 20 |
| Embodiment 9 | PVDF | 50 | 50 | 85 | 200 | Film | 115 | 20 |
| Embodiment 10 | PVDF | 50 | 50 | 70 | 100 | Powder | 120 | 25 |
| Embodiment 11 | PVDF | 50 | 100 | 70 | 100 | Powder | 115 | 20 |
| Embodiment 12 | PVDF | 50 | 200 | 70 | 100 | Powder | 120 | 20 |
| Embodiment 13 | $BaTiO_3$ monocrystal sheet | 1 | 0.1 | 50 | 10 | Film | 72 | 70 |
| Embodiment 14 | $BaTiO_3$ monocrystal sheet | 1 | 1 | 50 | 10 | Film | 90 | 40 |
| Embodiment 15 | $BaTiO_3$ monocrystal sheet | 1 | 3 | 50 | 10 | Film | 105 | 30 |
| Embodiment 16 | $BaTiO_3$ monocrystal sheet | 1 | 5 | 50 | 10 | Film | 102 | 30 |
| Embodiment 17 | $BaTiO_3$ monocrystal sheet | 1 | 3 | 50 | 50 | Film | 108 | 25 |
| Embodiment 18 | $BaTiO_3$ monocrystal sheet | 1 | 3 | 50 | 100 | Film | 113 | 20 |
| Embodiment 19 | $BaTiO_3$ monocrystal sheet | 1 | 3 | 50 | 200 | Film | 110 | 25 |
| Embodiment 20 | Tellurium oxide monocrystal | 1.2 | 3 | 40 | 100 | Film | 112 | 28 |
| Embodiment 21 | Nylon-7 | 97 | 280 | 69 | 50 | Film | 118 | 21 |
| Embodiment 22 | $BaTiO_3$ powder | 1 | 1 | 50 | 100 | Powder | 128 | 25 |
| Embodiment 23 | $BaTiO_3$ powder | 1 | 3 | 50 | 100 | Powder | 135 | 20 |
| Embodiment 24 | $BaTiO_3$ powder | 1 | 5 | 50 | 100 | Powder | 130 | 25 |
| Embodiment 25 | $BaTiO_3$ powder | 1 | 3 | 40 | 100 | Powder | 105 | 47 |
| Embodiment 26 | $BaTiO_3$ powder | 1 | 3 | 90 | 100 | Powder | 95 | 32 |
| Embodiment 27 | Lead zirconate titanate $PbZr_{0.6}Ti_{0.4}O_3$ | 0.7 | 3 | 50 | 100 | Powder | 94 | 29 |
| Comparative Embodiment 1 | / | | / | / | / | / | 50 | 500 |
| Comparative Embodiment 2 | PVDF | 50 | 0 | 85 | 10 | Film | 55 | 120 |
| Comparative Embodiment 3 | PVDF | 50 | −100 | 85 | 10 | Film | 45 | 350 |
| Comparative Embodiment 4 | PVDF | 50 | −10 | 85 | 10 | Film | 48 | 200 |
| Comparative Embodiment 5 | PVDF | 50 | −50 | 85 | 10 | Film | 46 | 300 |
| Comparative Embodiment 6 | PVDF | 50 | 0 | 70 | 100 | Powder | 56 | 200 |
| Comparative Embodiment 7 | PVDF | 50 | −100 | 70 | 100 | Powder | 46 | 300 |
| Comparative Embodiment 8 | PVDF | 50 | −10 | 70 | 100 | Powder | 48 | 200 |
| Comparative Embodiment 9 | PVDF | 50 | −50 | 70 | 100 | Powder | 46 | 300 |
| Comparative Embodiment 10 | $BaTiO_3$ monocrystal sheet | 1 | 0 | 50 | 10 | Film | 65 | 140 |
| Comparative Embodiment 11 | $BaTiO_3$ monocrystal sheet | 1 | −5 | 50 | 10 | Film | 40 | 400 |
| Comparative Embodiment 12 | $BaTiO_3$ monocrystal sheet | 1 | −1 | 50 | 10 | Film | 46 | 250 |
| Comparative Embodiment 13 | $BaTiO_3$ monocrystal sheet | 1 | −3 | 50 | 10 | Film | 45 | 350 |
| Comparative Embodiment 14 | $BaTiO_3$ powder | 1 | 0 | 50 | 100 | Powder | 55 | 300 |
| Comparative Embodiment 15 | $BaTiO_3$ powder | 1 | −5 | 50 | 100 | Powder | 42 | 400 |
| Comparative Embodiment 16 | $BaTiO_3$ powder | 1 | −1 | 50 | 100 | Powder | 48 | 350 |
| Comparative Embodiment 17 | $BaTiO_3$ powder | 1 | −3 | 50 | 100 | Powder | 42 | 400 |

Note:
"/" in Table 6 indicates that there is no corresponding preparation parameter.

As can be seen from Embodiment 1, Embodiment 2, Embodiment 3, Embodiment 4, Embodiment 5, and Embodiment 6 versus Comparative Embodiment 2, Comparative Embodiment 3, Comparative Embodiment 4, Comparative Embodiment 5; Embodiment 10, Embodiment 11, and Embodiment 12 versus Comparative Embodiment 6, Comparative Embodiment 7, Comparative Embodiment 8, and Comparative Embodiment 9; Embodiment 13, Embodiment 14, Embodiment 15, and Embodiment 16 versus Comparative Embodiment 10, Comparative Embodiment 11, Comparative Embodiment 12, and Comparative Embodiment 13, and Embodiment 22, Embodiment 23, and Embodiment 24 versus Comparative Embodiment 14, Comparative Embodiment 15, Comparative Embodiment 16, and Comparative Embodiment 17, when the lithium metal batteries with the same type of negative electrode framework are in use, the cycle performance and the volume expansion performance of the batteries vary with the strength of the polarization electric field. After the negative electrode plate is polarized by using the strength and direction of the polarization electric field within the range specified in this application, the volume expansion of the lithium metal battery can be mitigated effectively, and the cycle performance of the lithium metal battery can be enhanced effectively.

Generally, the thickness and porosity of the negative electrode framework also affect the cycle performance and volume expansion performance of the lithium metal battery. As can be seen from Embodiments 2, 7, 8, 9, 15, 17, 18, and 19, a lithium metal battery of a low volume expansion rate and excellent cycle performance can be obtained as long as the thickness of the negative electrode framework falls within the range specified in this application. As can be seen from Embodiments 23, 25, and 26, a lithium metal battery of a low volume expansion rate and excellent cycle performance can be obtained as long as the porosity of the negative electrode framework falls within the range specified in this application.

As can be seen from Embodiment 1, Embodiment 2, Embodiment 3, Embodiment 4, Embodiment 5, Embodiment 6, Embodiment 7, Embodiment 8, Embodiment 9, Embodiment 10, Embodiment 11, Embodiment 12, Embodiment 13, Embodiment 14, Embodiment 15, Embodiment 16, Embodiment 17, Embodiment 18, Embodiment 19, Embodiment 20, Embodiment 21, Embodiment 22, Embodiment 23, Embodiment 24, Embodiment 25, Embodiment 26, Embodiment 27, and Comparative Embodiment 1, compared with a lithium-ion battery with no negative electrode framework disposed in the negative electrode plate (for example, in Comparative Example 1), the negative electrode plate provided with the negative electrode framework within the range specified in this application can significantly mitigate the volume expansion of the lithium metal battery and improve the cycle performance of the lithium metal battery.

As can be learned from the foregoing analysis, the negative electrode plate according to this application includes a negative current collector, a lithium metal negative electrode, and a negative electrode framework in which a polarization electric field exists. The direction of the polarization electric field is directed from a surface of the negative electrode to the negative current collector. The material of the negative electrode framework includes at least one of a piezoelectric polymer, piezoelectric ceramic, or piezoelectric monocrystal. The negative electrode plate can effectively suppress the growth of lithium dendrites, effectively mitigate the volume expansion of the electrochemical device, and further improve the cycle performance of the electrochemical device.

The foregoing descriptions are merely preferred embodiments of this application, but are not intended to limit this application. Any modifications, equivalent substitutions, and improvements made within the spirit and principles of this application fall within the protection scope of this application.

What is claimed is:

1. A negative electrode plate, comprising: a negative current collector, a lithium metal negative electrode, and a negative electrode framework,
   wherein a polarization electric field exists inside the negative electrode framework, a direction of the polarization electric field is directed from a surface of the negative electrode plate to the negative current collector, and a material of the negative electrode framework comprises a piezoelectric polymer;
   wherein a room-temperature coercive field strength Ec of the material of the negative electrode framework satisfies: 10 kV/mm<Ec<100 kV/mm; and
   wherein the negative electrode framework was polarized in an electric field having a strength of 1 to 6 times the room-temperature coercive field strength Ec to generate the polarization electric field inside the negative electrode frame.

2. The negative electrode plate according to claim 1, wherein the negative electrode framework comprises the piezoelectric polymer and the piezoelectric polymer comprises polyvinylidene difluoride, a vinylidene difluoride-trifluoroethylene copolymer, a vinylidene difluoride-tetrafluoroethylene copolymer, a vinylidene dicyanide vinyl acetate copolymer, a vinylidene dicyanide-vinyl benzoate copolymer, a vinylidene dicyanide-vinyl propionate copolymer, a vinylidene dicyanide vinyl pivalate copolymer, a vinylidene dicyanide-methyl methacrylate copolymer, a vinylidene dicyanide-isobutylene copolymer, or a nylon-odd number piezoelectric polymer —(HN—(CH$_2$)$_x$—CO—)$_n$—, wherein x is an even number within 2 to 10, and n is an integer within 90 to 400.

3. The negative electrode plate according to claim 1, wherein a porosity of the negative electrode framework is 5% to 90%.

4. The negative electrode plate according to claim 1, wherein a thickness of the negative electrode framework is 1 μm to 200 μm.

5. The negative electrode plate according to claim 1, wherein the negative electrode framework comprises a powder framework or a film framework;
   the powder framework comprises powder of the piezoelectric polymer; and
   the film framework comprises the piezoelectric polymer.

6. The negative electrode plate according to claim 5, wherein the inorganic piezoelectric film comprises metal oxide, nitride, carbide, or an intermetallic compound.

7. An electrochemical device, comprising: a negative electrode plate, wherein the negative electrode plate comprises a negative current collector, a lithium metal negative electrode, and a negative electrode framework,
   wherein a polarization electric field exists inside the negative electrode framework, a direction of the polarization electric field is directed from a surface of the negative electrode plate to the negative current collector, and a material of the negative electrode framework comprises a piezoelectric polymer;

wherein a room-temperature coercive field strength Ec of the material of the negative electrode framework satisfies: 10 kV/mm<Ec<100 kV/mm; and wherein the negative electrode framework was polarized in an electric field having a strength of 1 to 6 times the room-temperature coercive field strength Ec to generate the polarization electric field inside the negative electrode frame.

8. The electrochemical device according to claim 7, wherein a porosity of the negative electrode framework is 5% to 90%.

9. The electrochemical device according to claim 7, wherein a thickness of the negative electrode framework is 1 μm to 200 μm.

10. The electrochemical device according to claim 7, wherein the negative electrode framework comprises the piezoelectric polymer and the piezoelectric polymer comprises polyvinylidene difluoride, a vinylidene difluoride-trifluoroethylene copolymer, a vinylidene difluoride-tetrafluoroethylene copolymer, a vinylidene dicyanide-vinyl acetate copolymer, a vinylidene dicyanide-vinyl benzoate copolymer, a vinylidene dicyanide-vinyl propionate copolymer, a vinylidene dicyanide-vinyl pivalate copolymer, a vinylidene dicyanide-methyl methacrylate copolymer, a vinylidene dicyanide isobutylene copolymer, or a nylon-odd number piezoelectric polymer —$(HN—(CH_2)_x—CO—)_n$—, wherein x is an even number within 2 to 10, and n is an integer within 90 to 400.

11. An electronic device, comprising the electrochemical device according to claim 7.

12. The negative electrode plate according to claim 1, wherein the room-temperature coercive field strength Ec of the material of the negative electrode framework satisfies: 40 kV/mm<Ec<100 kV/mm.

13. The negative electrode plate according to claim 1, wherein the negative electrode framework consists of a porous film of the piezoelectric polymer.

14. The electrochemical device according to claim 7, wherein the room-temperature coercive field strength Ec of the material of the negative electrode framework satisfies: 40 kV/mm<Ec<100 kV/mm.

15. The electrochemical device according to claim 7, wherein the negative electrode framework consists of a porous film of the piezoelectric polymer.

* * * * *